P. H. SEERY.
SHOCK ABSORBER.
APPLICATION FILED APR. 29, 1914.

1,186,046.

Patented June 6, 1916.

WITNESSES
INVENTOR
Peter H. Seery
BY
E. W. Marshall
ATTORNEY

UNITED STATES PATENT OFFICE.

PETER H. SEERY, OF EAST ORANGE, NEW JERSEY.

SHOCK-ABSORBER.

1,186,046.  Specification of Letters Patent.  Patented June 6, 1916.

Application filed April 29, 1914. Serial No. 835,092.

*To all whom it may concern:*

Be it known that I, PETER H. SEERY, a citizen of the United States of America, and a resident of East Orange, Essex county, and State of New Jersey, have invented certain new and useful Improvements in Shock-Absorbers, of which the following is a specification, reference being had to the accompanying drawings, forming a part thereof.

My invention relates to means for opposing and reducing the vibration of a vehicle body on its supporting springs, and specially to shock absorbers which are adapted for use on automobiles and other high speed road vehicles.

One object of my invention is to provide a simple and durable device of the aforesaid character, that shall be effective for its intended purpose, readily adjustable, and relatively inexpensive to manufacture.

Other objects and advantages of my invention will be set forth hereinafter, and in order that my invention may be thoroughly understood, I will now proceed to describe the same in the following specification, and then point out the novel features thereof in appended claims.

Figure 1:
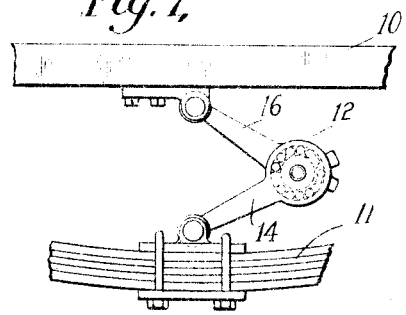
Figure 2:
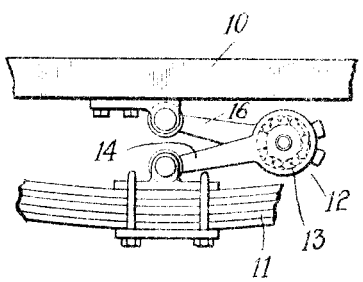
Figure 3:
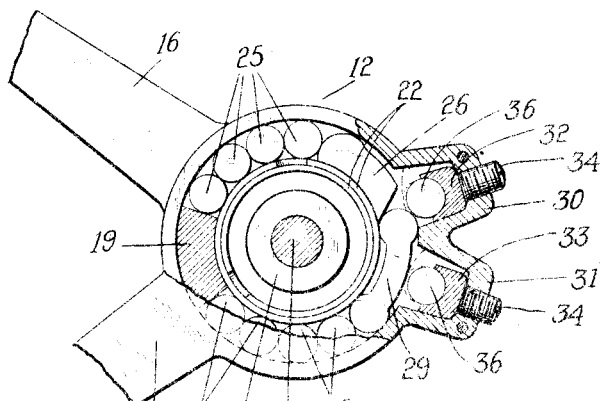
Figure 4:
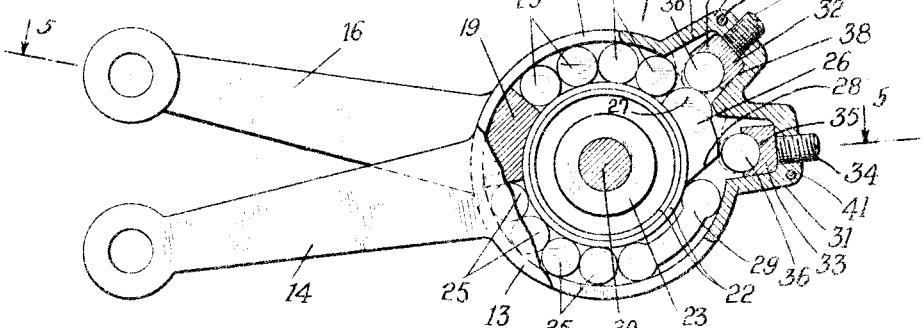
Figure 5:
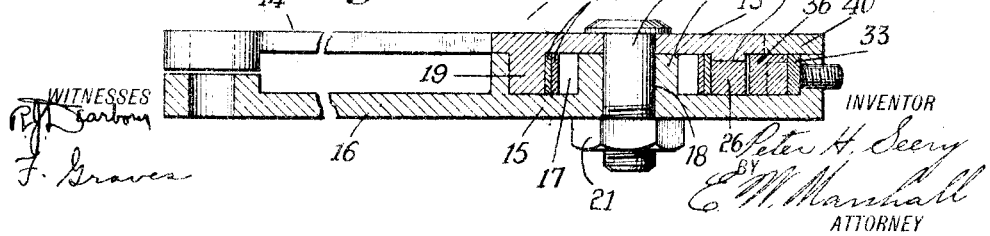

Referring to the drawings: Figure 1 is a side elevation of a shock absorber embodying my invention, together with parts of the vehicle body and spring to which it is attached. The same device is correspondingly shown in Fig. 2 as attached to vehicle members which are normally much closer together than those of Fig. 1. Fig. 3 is a partially sectional elevation of the shock absorber drawn to a larger scale with one member broken away and shown in section to disclose the details of its structure and showing the device in its neutral position. Fig. 4 corresponds to Fig. 3 except that the absorber is shown in a compressed position. Fig. 5 is a sectional elevation at right angles to Fig. 4 and taken on the line 5—5 thereof.

A vehicle body 10 is supported in a well known manner by springs of which a part of one is shown at 11. Interposed between the body and the spring is a shock absorber 12 which embodies my invention.

The shock absorber comprises a plate or disk 13 having a lever arm 14, a hub 15 having a lever arm 16, and a plurality of retarding members mounted in the hub, as hereinafter explained.

The hub 15 has an annular groove 17 and a central hole 18. The plate 13 has an annular projection 24 and a relatively prominent segmental projection 19 which extends beyond the projection 24, of which it forms a part, into the annular groove or channel 17 of the hub. The parts are joined by a pin or bolt 20 which extends through the hole 18 and is held against removal by a nut 21. The pin or bolt constitutes a pivot about which the lever arms 14 and 16 may swing.

Extending into the channel 17 are one or more circular springs 22 which are materially larger in diameter than the central boss 23 of the hub and are arranged to fit within the annular projection 24. The springs 22 obviously serve as a partition and divide the channel 17 into a pair of concentric annular channel portions. In the outer channel portion adjacent to the respective ends of the projection 19 are a plurality of rollers 25. The rollers are preferably identical and interchangeable and the diameter of each is substantially equal to the width of the segmental projection 19. As shown in Figs. 1, 3 and 4, there are four of these rollers on each side of the projection, but as clearly indicated in Fig. 2, three may be located on one side and five on the other, or any suitable combination employed so as to accommodate the device to different vehicles or to different other mechanisms. The outer portion of the annular channel 17 contains, in addition to the rollers 25 and the projection 19, a block 26 having a cylindrically enlarged curved end 27 and a beveled end 28, and another block 29 which has two cylindrically curved enlarged ends.

The hub 15 has a pair of hollow ears or projections 30 and 31 in which are located blocks 32—33. In the end of each projection is an adjusting screw 34 which acts radially upon the corresponding block and partially determines the position of the block in the projection.

Each block has a cylindrically curved socket 35 in which is seated a roller 36. If the ends of the block are suitably formed the rollers 36 may be omitted. The blocks 32—33 fit loosely into the hollow projections in which they are mounted and may tilt into contact with either one side 38 or the opposite side 39 of the opening. If the block 32 is adjusted by the screw 34 when it is in engagement with the surface 38, the roller 36 will move in a radial line but if the block has titlted into engagement with the surface 39 the roller is at a slightly greater distance from the center of the hub and will be adjusted at an angle to the radius. The blocks are tilted to one side or the other, dependent upon whether the arms of the device are moved toward or away from each other and the object of this arrangement will be apparent from the operation of the device as hereinafter set forth.

A plate 40 covers the hollow projections 30—31 and is secured in position by screws or pins 41. This plate may however, be integral with, or attached to the plate 13 which is arranged to cover the remainder of the hub 15.

The operation of the device is as follows: Assuming that the parts occupy positions as indicated in Figs. 1 and 3, when the vehicle is at rest, if the vehicle is then put in motion and, while traveling at high speed, its wheels traverse a hump on the road, there is a tendency for the vehicle body to compress the spring and, when the hump is passed, for the spring to expand, throwing the body upwardly with considerable violence. This tendency is entirely overcome by the use of my improved shock absorber because the downward movement of the body when the spring is compressed moves the arms 14 and 16 of the shock absorber toward each other into the position shown in Fig. 4. In changing from the relation shown in Fig. 3 to that of Fig. 4, the projection 19 forces one set of rollers 25 and the block 26 in a clockwise direction while the block 29 and the remaining rollers 25 are moved in the same direction by the block 26.

By reason of the fact that the block has a beveled end 28 which acts upon the enlarged curved end of the block 29, the block tends to wedge itself against the springs 22 which are thereby somewhat distorted and offer a material resistance to the movement of the arms toward each other and to the downward movement of the body. Furthermore, the enlarged curved ends of the block 26 and the block 29 are sufficiently large to successively engage the rollers 36 which are seated on the blocks 32 and 33. This engagement produces a very strong resistance to the downward movement of the body by materially distorting the spring 22. However, the parts are so arranged that the blocks 32 and 33 are tilted by the curved ends of the block 26 and the pawl 29 against the opposite sides of the hollow projections in which they are located when the body starts to rise. The segmental projection 19 then moves in the opposite direction and forces the rollers 25 and the block 29 in a counter-clockwise direction, the same wedge-action being produced between the block 29 and the block 26.

The blocks 32 and 33 are alike and a description of the operation of one will suffice for both. When block 32 is tilted against the surface 39 the center of the roller 36 is thrown out of the radial line of the adjusting screw 34 and hence occupies a position at a slightly greater distance from the center of the pivot pin 20. Thus in the upward direction of body movement the distortion of the spring is less and the retarding effect of the shock absorber is reduced, although it still continues at a material value.

In each direction of movement the enlarged ends of the block 29 act upon the rollers 36 as also does the curved end 27 of the block 26. In the assembled device the curved ends of the members 26 and 29 are spaced with substantial uniformity and therefore there are two normal positions to which the device may be set, as illustrated in Figs. 2 and 3, in which there is a relatively free limited movement permitted. This arrangement retains the easy riding qualities of the vehicle while at the same time it prevents undesirable vibration.

Among other advantages, my improved shock absorber is very readily adjusted to suit varying conditions of load and furthermore comprises a comparatively few number of simple parts which are inexpensive to construct. Furthermore, all of the parts which have any tendency to wear may be very readily replaced.

Various modifications may be effected within the spirit and scope of my invention and I intend that only such limitations be imposed as are indicated in appended claims.

What I claim is:

1. A member having a curved surface, a plurality of blocks arranged adjacent thereto and guided thereby, a second relatively rotatable member having a projection for actuating the blocks, and a resilient means in engagement with the blocks and adapted to be distorted by the blocks and to resist rotative movement of the members.

2. A member having a cylindrically curved shoulder, a plurality of blocks arranged adjacent to said shoulder, a resilient means holding the blocks in position, and a second relatively rotatable member having a projection extending into position to actuate the blocks and thereby distort the resilient means.

3. A member having a cylindrically curved shoulder, a plurality of blocks having enlarged ends arranged adjacent to said shoulder, resilient means holding the blocks in position, and a second relatively rotatable member having a projection extending into position to actuate the blocks and thereby cause the enlarged ends of the blocks to distort the resilient means.

4. A circularly curved spring, a concentrically curved casing, a plurality of detached blocks in contact with said spring and said casing and arranged to distort the spring, a relatively rotatable member arranged to move said blocks between the casing and the spring, said member being retarded in both directions by the action of the blocks on the spring.

5. Two pivotally connected lever arms, a hub carried by one arm and having a flange, a circularly curved spring concentric with the flange, and a plurality of rollers and blocks between the flange and spring, an actuating projection carried by the other arm and extending into the space between the flange and the spring to actuate the blocks and to retard the relative movement of the arms.

6. Two pivotally connected lever arms, a hub carried by one arm having a flange, a circularly curved spring concentric with the flange, and a plurality of rollers and blocks between the flange and spring, an actuating projection carried by the other arm and extending into the space between the flange and the spring to actuate the blocks and to retard the relative movement of the arms, and means for partially obstructing the path of movement of the blocks to effect a resistance to the relative movement of the arms.

7. Two pivotally connected lever arms, a hub carried by one arm having a flange, a circularly curved spring concentric with the flange, and a plurality of rollers and blocks having enlarged ends between the flange and spring, an actuating projection carried by the other arm and extending into the space between the flange and the spring to actuate the blocks to retard the relative movement of the arms, and means for engaging the enlarged ends of the blocks to partially obstruct the path of movement of the blocks to distort the spring to thereby effect a resistance to the relative movement of the arms.

8. Two pivotally connected lever arms, a hub carried by one arm and having a flange, a circularly curved spring concentric with the flange, and a plurality of rollers and blocks between the flange and spring, an actuating projection carried by the other arm and extending into the space between the flange and the spring to actuate the blocks and to retard the relative movement of the arms, and means for obstructing the path of movement of the blocks automatically unequally in the respective directions of relative movement between the arms.

9. Two pivotally connected lever arms, a hub carried by one arm having a flange, a circularly curved spring concentric with the flange, and a plurality of rollers and blocks adjustable between the flange and spring, an actuating projection carried by the other arm and extending into the space between the flange and the spring to actuate the blocks and to retard the relative movement of the arms, and means for automatically rendering said obstruction unequal in the respective directions of relative movement between the arms.

10. Two pivotally connected lever arms, a hub carried by one arm provided with a flange having a circularly curved portion and an offset portion forming a hollow boss, a circularly curved spring concentric with the flange and a plurality of rollers and blocks having enlarged ends between the flange and the spring, an actuating projection carried by the other arm and extending into the space between the flange and the spring to actuate the blocks, a member in said hollow boss, and means for adjusting the member in the boss to constitute a greater or less obstruction in the path of movement of the blocks to the passage of the enlarged ends of the blocks to cause the movement of the blocks to distort the spring a predetermined amount.

11. A shock absorber comprising a pair of pivoted members, one having an annular slot with its center in the pivotal axis, a pair of hollow bosses forming pockets opening into the annular slot and a lever arm; the other having a projection extending into said annular slot and a lever arm; a plurality of rollers and blocks having enlarged ends disposed in said annular slot and adapted to be revolubly moved therein, a circular spring confining the rollers and blocks to the outer portion of the annular slot, and members adjustably mounted in said pockets.

12. A shock absorber comprising a pair of pivoted members, one having an annular slot with its center in the pivotal axis, a pair of hollow bosses forming pockets opening into the annular slot and a lever arm; the other having a projection extending into said annular slot and a lever arm; a plurality of rollers and blocks having enlarged ends disposed in said annular slot and adapted to be revolubly moved therein, a circular spring confining the roller and blocks to the outer portion of the annular slot, members in said pockets arranged to engage the enlarged ends of the blocks to resist the movement thereof, and means for adjusting the position of the members to vary the resisting effect of the members to the movement of the blocks.

13. A shock absorber comprising a pair of pivoted members, one having an annular slot with its center in the pivotal axis, a pair of hollow bosses forming pockets opening into the annular slots and a lever arm; the other having a projection extending into said annular slot and a lever arm; a plurality of rollers and blocks having enlarged ends disposed in said annular slot and adapted to be revolubly moved therein, a circular spring confining the rollers and blocks to the outer portion of the annular slot, members in said pockets adapted to be tilted from one side of the pocket to the other by the blocks dependent upon the direction of relative movement between the pivoted arms, said members being arranged to engage the enlarged ends of the blocks to resist the movement thereof, and adjustable means for determining the maximum obstruction to the annular slot effected by the members, said pockets being so formed that the members offer less obstruction and resisting effect when tilted to one side of the pockets than when tilted to the other side.

In witness whereof, I have hereunto set my hand this 28 day of April, 1914, in the presence of two subscribing witnesses.

PETER H. SEERY.

Witnesses:
F. GRAVES,
ERNEST W. MARSHALL.